United States Patent [19]  [11] 4,339,375
Calundann et al.  [45] Jul. 13, 1982

[54] POLY(ESTER-AMIDE) CAPABLE OF FORMING AN ANISOTROPIC MELT PHASE DERIVED FROM P-HYDROXYBENZOIC ACID, 2,6-DIHYDROXYNAPHTHALENE, CARBOCYCLIC DICARBOXYLIC ACID, AROMATIC MONOMER CAPABLE OF FORMING AN AMIDE LINKAGE, AND, OPTIONALLY, ADDITIONAL AROMATIC DIOL

[75] Inventors: Gordon W. Calundann, N. Plainfield; Larry F. Charbonneau, Chatham; Anthony J. East, Madison, all of N.J.

[73] Assignee: Celanese Corporation, New York, N.Y.

[21] Appl. No.: 270,439

[22] Filed: Jun. 4, 1981

[51] Int. Cl.$^3$ .............................................. C08G 69/44
[52] U.S. Cl. .................................. 524/602; 528/125; 528/128; 528/172; 528/183; 528/185; 528/288
[58] Field of Search ............... 528/125, 128, 172, 183, 528/185, 288; 260/37 N

[56] References Cited
U.S. PATENT DOCUMENTS 3,859,251 1/1975 Kuhfuss et al. ..................... 528/183
4,182,842 1/1980 Jackson et al. ..................... 528/184
4,272,625 6/1981 McIntyre et al. .................... 528/183

Primary Examiner—Lester L. Lee
Attorney, Agent, or Firm—Charles B. Barris

[57] ABSTRACT

A melt processable poly(ester-amide) which is capable of forming an anisotropic melt phase is provided. The poly(ester-amide) of the present invention consists essentially of the recurring units (a) p-oxybenzoyl moiety, (b) 2,6-dioxynaphthylene moiety, (c) carbocyclic dicarboxyl moiety, (d) aromatic moiety capable of forming an amide linkage in the polymer, and optionally, (e) p-dioxyaryl moiety, in the proportions indicated. Preferably, the aromatic moiety capable of forming an amide linkage is derived from p-aminophenol or p-phenylenediamine. The resulting poly(ester-amide) exhibits a melting temperature below approximately 400° C., preferably below approximately 350° C. The poly(ester-amide) of the present invention is preferably formed by a melt polymerization technique.

44 Claims, No Drawings

POLY(ESTER-AMIDE) CAPABLE OF FORMING AN ANISOTROPIC MELT PHASE DERIVED FROM P-HYDROXYBENZOIC ACID, 2,6-DIHYDROXYNAPHTHALENE, CARBOCYCLIC DICARBOXYLIC ACID, AROMATIC MONOMER CAPABLE OF FORMING AN AMIDE LINKAGE, AND, OPTIONALLY, ADDITIONAL AROMATIC DIOL

BACKGROUND OF THE INVENTION

The use of objects molded from synthetic polymers has expanded rapidly in the last several decades. In particular, polyesters and polyamides have widely gained acceptance for general molding applications and in the formation of fibers and films. An additional class of polymers known as poly(ester-amides) has been disclosed. Such disclosures include U.S. Pat. Nos. 2,547,113; 2,946,769; 3,272,774; 3,272,776; 3,440,218; 3,475,385; 3,538,058; 3,546,178; 3,575,928; 3,676,291; 3,865,792; 3,926,923; and 4,116,943. Polyimide esters are disclosed in German Offenlegungsschrift No. 2,950,939 and in U.S. Pat. No. 4,176,223.

Although many polyesters, polyamides, and poly(ester-amides) have mechanical properties suitable for general applications, most polyesters, polyamides, and poly(ester-amides) are not suitable for high strength service because the mechanical properties are not sufficiently high. One group of polymers that is suitable for high strength service without the use of a reinforcing agent is a new class of polymers exhibiting a general overall balance of mechanical properties substantially enhanced over previous polymers. These polymers and/or their melts have been described by various terms, including "liquid crystalline," "liquid crystal," "mesogenic," "thermoptropic," and "anisotropic". Briefly, the polymers of this new class are thought to involve a parallel ordering of the molecular chains. The state wherein the molecules are so ordered is often referred to either as the liquid crystal state or the nematic phase of the liquid crystal state. These polymers are prepared from monomers which are generally long, flat, and fairly rigid along the long axis of the molecule and commonly have chain extending linkages that are either coaxial or parallel.

Disclosures of polyesters which exhibit melt anisotropy include (a) *Polyester X7G-A Self-Reinforced Thermoplastic*, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1 to 4, (b) Belgian Pat. Nos. 828,935 and 828,936, (c) Dutch Pat. No. 7505551, (d) West German Nos. 2520819, 2520820, 2722120, 2834535, 28343536, and 2834537, (e) Japanese Nos. 43-223; 2132-116; 3017-692 and 3021-293, (f) U.S. Pat. Nos. 3,991,013; 3,991,014; 4,057,597; 4,066,620; 4,067,852; 4,075,262; 4,083,829; 4,093,595; 4,118,372; 4,130,545; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,228,218; 4,230,817; 4,232,143; 4,232,144; 4,238,598; 4,238,599; 4,245,082; 4,245,084; and 4,256,624; and (g) U.K. Application Nos. 2,002,404; 2,008,598A; and 2,030,158A. See also commonly assigned U.S. Ser. No. 91,003, filed Nov. 5, 1979; 109,573, filed Jan. 4, 1980 (now U.S. Pat. No. 4,265,802); Ser. No. 109,575 filed Jan. 4, 1980 (now U.S. Pat. No. 4,285,852); Ser. No. 128,759, filed Mar. 10, 1980 (now U.S. Pat. No. 4,299,756) Ser. No. 128,778, filed Mar. 10, 1980 (now U.S. Pat. No. 4,279,803); and 169,014, filed July 5, 1980.

Representative disclosures of liquid crystalline polyamide dopes include U.S. Pat. Nos. 3,673,143; 3,748,299; 3,767,756; 3,801,528; 3,804,791; 3,817,941; 3,819,587; 3,827,998; 3,836,498; 4,016,236; 4,018,735; 4,148,774; and Re. 30,352.

U.S. Pat. No. 4,182,842 discloses poly(ester-amides) prepared from an aromatic dicarboxylic acid, ethylene glycol, and a p-acylaminobenzoic acid. Such poly(ester-amides) are also disclosed in "Liquid Crystal Polmers. III. Preparation and Properties of Poly(Ester-Amides) from p-Aminobenzoic Acid and Poly(Ethylene Terephthalate)," by W. J. Jackson, Jr. and H. F. Kuhfuss, *J. Appl. Polym. Sci.*, Vol. 25, No. 8, pp. 1685–94 (1980). A similar disclosure is Japan 54 125271. These references neither disclose nor suggest the poly(ester-amide) of the present invention.

European Patent Application No. 79301276.6 (Publication No. 0 007 715) discloses melt processable fiber-forming poly(ester-amides) comprising residues of one or more aminophenols selected from p-aminophenol and p-N-methylaminophenol and residues of one or more dicarboxylic acids. The poly(ester-amide) contains a balance of linear difunctional residues and dissymmetric difunctional residues derived from either the aminophenols or the acids. The linear difunctional residues and dissymmetric difunctional residues are chosen so as to give a product which melts below its decomposition temperature and exhibits optical anisotropy in the melt. The patent neither discloses nor suggests the poly(ester-amide) of the present invention which contains a p-oxybenzoyl moiety.

U.S. Pat. No. 3,859,251 discloses a poly(ester-amide) which includes adicarboxyl moiety which comprises 50 to 100 mole percent of units derived from an alicyclic dicarboxylic acid. Such units are not required in the poly(ester-amide) of the present invention. Moreover, there is no disclosure in the patent of the formation of an anisotropic melt phase.

U.S. Pat. No. 3,809,679 discloses poly(ester-amides) consisting of 10 to 90 mole percent of recurring structural units derived from a dicarboxylic acid dihalide and a dihydroxy compound of a specified formula and 10 to 90 mole percent of recurring structural units derived from a dicarboxylic acid dihalide and a diamino compound of a specified formula. The poly(ester-amides) specifically exclude moieties derived from aromatic hydroxyacids, such as the p-oxybenzoyl moiety included in the poly(ester-amide) of the present invention. Furthermore, most, if not all, of the poly(ester-amides) disclosed are not readily melt processable, and there is no disclosure of the existence of an anisotropic melt phase.

Commonly assigned U.S. application Ser. No. 214,557, filed Dec. 9, 1980, entitled "Poly(ester-amide) Capable of Forming an Anisotropic Melt Phase Derived From 6-Hydroxy-2-Naphthoic Acid, Dicarboxylic Acid, and Aromatic Monomer Capable of Forming an Amide Linkage" (Inventors: Anthony J. East, Larry F. Charbonneau, and Gordon W. Calundann), Ser. No. 251,629, filed Apr. 6, 1981, entitled "Poly(ester-amide) Capable of Forming an Anisotropic Melt Phase Derived From 6-Hydroxy-2-Naphthoic Acid, Other Aromatic Hydroxyacid, Carbocyclic Dicarboxylic Acid, and Aromatic Monomer Capable of Forming an Amide Linkage" (Inventors: Larry F. Charbonneau, Anthony J. East, and Gordon W. Calundann), and Ser. No. 251,625, filed Apr. 6, 1981 entitled "Poly(ester-amide) Capable of Forming an Anisotropic Melt Phase Derived from 6-Hydroxy-2-Naphthoic Acid, Aromatic Monomer Capable of Forming an Amide Linkage, and Other Aromatic Hydroxyacid" (Inventors: Gordon W. Calundann, Larry F. Charbonneau, and Anthony J. East), disclose melt processable poly(ester-amides) exhibiting anisotropy in the melt phase which include an oxynaphthoyl moiety. The poly(ester-amide) of the present invention, which does not include an oxynaphthoyl moiety, likewise demonstrates anisotropy and excellent tractability in the melt phase.

Commonly assigned U.S. application Ser. No. 251,818, filed Apr. 7, 1981, entitled "Poly(ester-amide) Capable of Forming an Anisotropic Melt Phase Derived from 2,6-Dihydroxyanthraquinone, p-Hydroxybenzoic Acid, Dicarboxylic Acid, and Aromatic Monomer Capable of Forming an Amide Linkage" (Inventors: Larry F. Charbonneau, Gordon W. Calundann, and Anthony J. East), and Ser. No. 251,819, filed Apr. 7, 1981, entitled "Poly(ester-amide) Capable of Forming an Anisotropic Melt Phase Derived from p-Hydroxybenzoic Acid, 2,6-Naphthalenedicarboxylic Acid, Aromatic Monomer Capable of Forming an Amide Linkage, and, Optionally, Hydroquinone and Additional Carbocyclic Dicarboxylic Acid" (Inventors: Anthony J. East, Gordon W. Calundann, and Larry F. Charbonneau), disclose melt processable poly(ester-amides) exhibiting anisotropy in the melt phase which do not include a 2,6-dioxynaphthylene moiety, as does the poly(ester-amide) of the present invention. The poly(ester-amide) of the present invention, which includes a 2,6-dioxynaphthylene moiety, has been found to exhibit an anisotropic melt phase in combination with excellent tractability.

It is an object of the present invention to provide an improved poly(ester-amide) which is suited for the formation of quality molded articles, melt extruded fibers, and melt extruded films.

It is also an object of the present invention to provide an improved poly(ester-amide) which forms a highly tractable melt phase.

It is also an object of the present invention to provide an improved poly(ester-amide) which forms an anisotropic melt phase at a temperature well below its decomposition temperature and which may form quality fibers, films, and molded articles.

It is also an object of the present invention to provide an improved melt processable poly(ester-amide) capable of forming an anisotropic melt phase at a temperature below approximately 400° C., and preferably below approximately 350° C.

It is also an object of the present invention to provide an improved melt processable poly(ester-amide) which exhibits improved adhesion, improved fatigue resistance, and increased transverse strength.

These and other objects, as well as the scope, nature, and utilization of the present invention, will be apparent to those skilled in the art from the following detailed description.

SUMMARY OF THE INVENTION

A melt processable poly(ester-amide) capable of forming an anisotropic melt phase at a temperature below approximately 400° C. is provided. The poly(ester-amide) consists essentially of the recurring moieties I, II, III, IV, and, optionally, V wherein I is

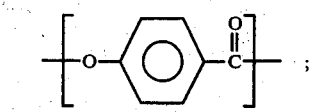

II is

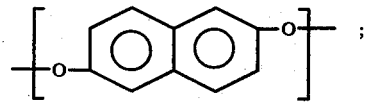

III is

where A is a divalent carbocyclic radical;

IV is $+Y-Ar-Z+$, where Ar is a divalent radical comprising at least one aromatic ring, Y is O, NH, or NR, and Z is NH or NR, where R is an alkyl group of 1 to 6 carbon atoms or an aryl group; and V is $+O-Ar'-O+$, where Ar' is a divalent radical comprising at least one aromatic ring, other than naphthylene, wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein moiety I is present in a concentration within the range of approximately 20 to 80 mole percent, moiety II is present in a concentration within the range of approximately 5 to 30 mole percent, moiety III is present in a concentration within the range of approximately 10 to 40 mole percent, moiety IV is present in a concentration within the range of approximately 5 to 30 mole percent, and moiety V is present in a concentration within the range of approximately 0 to 20 mole percent, with the total molar concentration of moieties II, IV, and V being substantially equal to the molar concentration of moiety III.

DESCRIPTION OF THE PREFERRED EMBODIMENTS

The poly(ester-amide) of the present invention includes at least four recurring moieties which when combined in the poly(ester-amide) have been found to form an atypical, optically anisotropic melt phase. The polymer forms an anisotropic melt phase at a temperature below approximately 400° C. (e.g., below approximately 350° C.) The polymer melting temperatures may be confirmed by the use of a differential scanning calorimeter (i.e., DSC) employing repeat scans at a 20° C. per minute heat-up rate and by observing the peak of the DSC melt transition. The poly(ester-amide) commonly exhibits a melting temperature of at least approximately 200° C. and preferably of at least approximately 250° C. as determined by differential scanning calorimetry. The poly(ester-amide) of the present invention may exhibit more than one DSC transition temperature.

Because of its ability to exhibit anisotropic properties (i.e., liquid crystalline properties) in the melt, the poly(ester-amide) readily can form a product having a highly oriented molecular structure upon melt processing. Preferred poly(ester-amide) compositions are capable of undergoing melt processing at a temperature within the range of approximately 250° C. to 350° C., as discussed more fully hereinafter.

The poly(ester-amide) includes four essential moieties. Moiety I can be termed a p-oxybenzoyl moiety and possesses the structural formula:

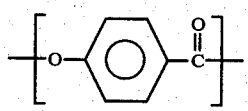

As will be apparent to those skilled in the art, moiety I can be derived from unsubstituted p-hydroxybenzoic acid and derivatives thereof. While not specifically illustrated in the structural formula, at least some of the hydrogen atoms present upon the aromatic rings of moiety I may be substituted. Representative ring substituted compounds from which moiety I can be derived include those bearing the following substituents: 3-chloro, 3-methyl, 3-methoxy, 3-phenyl, 3,5-dichloro, 3,5-dimethyl, 3,5-dimethoxy, etc. The presence of ring substitution tends to modify to some degree the physical properties of the resulting polymer (e.g., the polymer may soften at a lower temperature, its impact strength may be improved, and the crystallinity of the solid polymer may be decreased). In a preferred embodiment wherein a poly(ester-amide) of optimum crystallinity in the solid state is desired, no ring substitution is present.

Moiety I is present in the poly(ester-amide) in a concentration within the range of approximately 20 to 80 mole percent. Preferably, moiety I is present in a concentration within the range of approximately 40 to 60 mole percent and, more preferably, in a concentration within the range of approximately 50 to 60 mole percent.

Moiety II is a 2,6-dioxynaphthylene moiety and is represented by the structural formula:

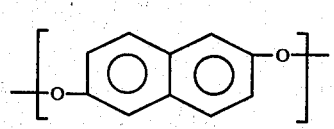

Although moiety II may be substituted in the same manner as moiety I, highly satisfactory polymers can be formed wherein moiety II is free of ring substitution.

As will be apparent to those skilled in the art, moiety II can be derived from unsubstituted 2,6-dihydroxynaphthalene and derivatives thereof.

Moiety II is present in the poly(ester-amide) of the present invention in a concentration within the range of approximately 5 to 30 mole percent and, preferably, within the range of approximately 10 to 25 mole percent. In especially preferred embodiments, moiety II is present in a concentration within the range of approximately 15 to 25 mole percent.

Moiety III is a carbocyclic dicarboxy moiety of the formula

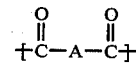

where A is a divalent carbocyclic radical. Preferably, the A radical comprises at least one aromatic ring or an aliphatic carbocyclic radical comprising at least one cyclohexylene radical, such as a divalent trans-1,4-cyclohexylene radical. Moiety III is more preferably selected from the group consisting of terephthaloyl moiety, trans-1,4-cyclohexylenedicarboxyl moiety, mixtures of terephthaloyl and isophthaloyl moieties, and mixtures of terephthaloyl and trans-1,4-cyclohexylenedicarboxyl moieties. Moiety III is most preferably a terephthaloyl moiety.

Moieties which may serve as a dicarboxyaryl moiety in the poly(ester-amide) of the present invention include terephthaloyl, isophthaloyl, 1,2-bis(p-oxybenzoyl)ethane, 4,4'-bibenzoyl, 4,4'-benzophenonedicarboxyl, 4,4'-diphenyletherdicarboxyl, etc.

In the case where A comprises at least one divalent cyclohexylene radical, it has been found that only cyclohexylene radicals in the trans configuration give rise to a poly(ester-amide) which exhibits anisotropy in the melt phase. This is believed to be due to the disruption and destruction of the rod-like nature of the polymer molecules by the presence of cyclohexylene radicals in the cis configuration. However, a relatively small amount of cyclohexylene radicals in the cis configuration, as compared with the total amount of polymer, can be tolerated without seriously affecting the anisotropic nature of the polymer in the melt. It is nevertheless preferable to maximize the amount of cyclohexylene radicals in the trans configuration which is present in the polymer. Thus, it is preferred that at least 90 percent (e.g., 95 percent or more) of the cyclohexylene radicals be present in the trans configuration.

Trans- and cis-1,4-cyclohexylene radicals can be distinguished from one another by such techniques as NMR and IR spectroscopy, as well as by the melting points of compounds containing such radicals. A melting point calibration curve is one means by which the relative amounts of trans- and cis-1,4-cyclohexylene radicals in a mixture of the isomers can be determined.

Although moiety III may be substituted in the same manner as moiety I, highly satisfactory polymers can be formed wherein the carbocyclic dicarboxylic moiety is free of ring substitution.

Moiety III is present in the poly(ester-amide) in a concentration within the range of approximately 10 to 40 mole percent. Preferably, moiety III is present in a concentration within the range of approximately 15 to 30 mole percent (e.g., within the range of approximately 20 to 30 mole percent).

Moiety IV represents an aromatic monomer which is capable of forming an amide linkage in the polymer. Moiety IV possesses the structural formula $+Y-Ar-Z+$, where Ar is a divalent radical comprising at least one aromatic ring, Y is O, NH, or NR, and Z is NH or NR, where R is an alkyl group of 1 to 6 carbon atoms or an aryl group. R is preferably a straight-chain alkyl group of 1 to 6 carbon atoms and is more preferably a methyl group. Preferably, the Ar radical is symmetrical. By "symmetrical," it is meant that the divalent bonds which join the moiety to other moieties in the main polymer chain are symmetrically disposed on one or more rings (e.g., are para to each other or diagonally disposed when present on a condensed ring system). In especially preferred embodiments, moiety IV is derived from p-aminophenol or p-phenylenediamine.

Examples of monomers from which moiety IV can be derived include p-aminophenol, p-N-methylaminophenol, p-phenylenediamine, N-methyl-p-phenylenediamine, N,N'-dimethyl-p-phenylenediamine, m-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxydiphenyl methane, 4-amino-4'-hydroxydiphenyl sulfide, 4,4'-diaminophenyl sulfide (thiodianiline), 4,4'-diaminodiphenyl sulfone, 2,5-diaminotoluene, 4,4'-ethylenedianiline, 4,4'-diaminodiphenoxyethane, 4,4'-diaminodiphenyl methane (methylene dianiline), 4,4'-diaminodiphenyl ether (oxydianiline), etc.

Although moiety IV may be substituted in the same manner as moiety I, highly satisfactory polymers can be formed wherein moiety IV is free of ring substitution.

Moiety IV is present in the poly(ester-amide) in a concentration within the range of approximately 5 to 30 mole percent. In preferred compositions, moiety III is present in a concentration within the range of approximately 5 to 15 mole percent (e.g., in a concentration within the range of approximately 5 to 10 mole percent).

In addition to the four essential moieties described above, the poly(ester-amide) may further include an additional moiety (moiety V).

Moiety V is a dioxyaryl moiety and is represented by the structural formula +O—Ar'—O+ where Ar' is a divalent radical comprising at least one aromatic ring, other than naphthylene.

Although moiety V may be substituted in the same manner as moiety I, moiety V is preferably free of ring substitution.

As will be apparent to those skilled in the art, moiety V can be derived from substituted and unsubstituted aromatic diols. Preferably, the Ar' radical of moiety V is symmetrical, as discussed above. More preferably, moiety V is derived from unsubstituted hydroquinone and derivatives thereof. Representative examples of ring substituted compounds from which moiety V can be derived include methylhydroquinone, chlorohydroquinone, bromohydroquinone, phenylhydroquinone, etc.

Moiety V is present in the poly(ester-amide) of the present invention in a concentration within the range of approximately 0 to 20 mole percent and, preferably, within the range of approximately 0 to 10 mole percent (e.g., approximately 5 to 10 mole percent).

The poly(ester-amide) of the present invention may consist essentially of, for example, approximately 20 to 80 mole percent of moiety I, approximately 5 to 30 mole percent of moiety II, approximately 10 to 40 mole percent of moiety III, approximately 5 to 30 mole percent of moiety IV, and approximately 0 to 20 mole percent of moiety V. Preferred compositions consist essentially of approximately 40 to 60 mole percent of moiety I, approximately 10 to 25 mole percent of moiety II, approximately 15 to 30 mole percent of moiety III, approximately 5 to 15 mole percent of moiety IV, and approximately 0 to 10 mole percent of moiety V. Even more preferred are those compositions which consist essentially of approximately 50 to 60 mole percent of moiety I, approximately 15 to 25 mole percent of moiety II, approximately 20 to 30 mole percent of moiety III, approximately 5 to 10 mole percent of moiety IV, and approximately 0 to 10 (e.g., approximately 5 to 10) mole percent of moiety V.

As will be apparent to those skilled in the art, the molar concentration of the dicarboxy units (i.e., moiety III) present in the polymer will be substantially equal to the total molar concentration of the amide-forming units (i.e., moiety IV) and the dioxy units (i.e., moieties II and V) present in the polymer.

It will further be apparent to those skilled in the art that the total molar concentration of moieties II, IV, and V and the molar concentration of moiety III will each be substantially equal to one-half of the difference between 100 mole percent and the molar concentration of moiety I in the polymer.

The various moieties, upon polymer formation, will tend to be present in a random order.

The substituents, if present, on the rings of each of the moieties described above are selected from the group consisting of an alkyl group of 1 to 4 carbon atoms, an alkoxy group of 1 to 4 carbon atoms, halogen, phenyl, and mixtures of the foregoing.

Other ester-forming moieties (e.g., dicarboxy, dioxy, or hydroxycarboxy units) other than those previously discussed additionally may be included in the poly(esteramide) of the present invention in a minor concentration as long as such moieties do not adversely influence the desired anisotropic melt phase exhibited by the poly(ester-amide) heretofore defined and do not raise the melting temperature of the resulting polymer above approximately 400° C.

The poly(ester-amide) of the present invention commonly exhibits

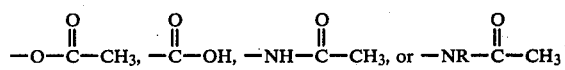

end groups depending upon the synthesis route selected. As will be apparent to those skilled in the art, the end groups optionally may be capped, e.g., acidic end groups may be capped with a variety of organic acids. For instance, end capping units such as phenyl ester

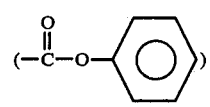

and methylester

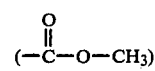

optionally may be included at the end of the polymer chains. The polymer also may be oxidatively crosslinked to at least some degree, if desired, by heating in an oxygen-containing atmosphere (e.g., in air) while in bulk form or as a previously shaped article at a temperature below its melting temperature for a limited period of time (e.g., for a few minutes).

The poly(ester-amide) of the present invention tends to be substantially insoluble in all common polyester solvents, such as hexafluoroisopropanol and o-chlorophenol, and accordingly is not susceptible to solution processing. It can surprisingly be readily processed by common melt processing techniques as discussed hereafter. Most compositions are soluble to some degree in pentafluorophenol.

The poly(ester-amide) of the present invention commonly exhibits a weight average molecular weight of about 5,000 to about 50,000, and preferably about 10,000 to 30,000, e.g., about 15,000 to 17,500. Such molecular weight may be determined by standard techniques not involving the solutioning of the polymer, e.g., by end group determination via infrared spectroscopy on compression molded films. Alternatively, light scattering techniques in a pentafluorophenol solution may be employed to determine the molecular weight.

The poly(ester-amide) of the present invention is capable of undergoing melt processing at a temperature within the range of approximately 200° C. to 400° C. Preferably, the polymer is melt processed at a temperature within the range of approximately 250° C. to 350° C. and more preferably within the range of approximately 270° C. to 330° C.

The melting temperature (Tm) of the poly(esteramide) of the present invention may vary widely with the composition of the poly(ester-amide).

The poly(ester-amide) prior to heat treatment additionally commonly exhibits an inherent viscosity (i.e., I.V.) of at least approximately 1.0 dl./g., and preferably at least approximately 2.0 dl./g., (e.g., approximately 3.0 to 8.0 dl./g.) when measured at a concentration of 0.1 weight/volume percent in pentafluorophenol at 60° C.

The poly(ester-amide) of the present invention commonly may be considered crystalline in the sense that fibers melt extruded therefrom exhibit X-ray diffraction patterns characteristic of polymeric crystalline materials when using Ni filtered CuK $\alpha$ radiation and flat plate cameras. In those embodiments wherein ring substitution is present as previously described, the poly(ester-amide) may be substantially less crystalline in the solid phase and exhibit diffraction patterns typical of oriented amorphous fibers. In spite of the crystallinity commonly observed, the poly(ester-amide) of the present invention nevertheless may be easily melt processed.

The poly(ester-amide) of the present invention is readily tractable and forms an anisotropic melt phase whereby an atypical degree of order is manifest in the molten polymer. The improved tractability of the present poly(ester-amide) is due, at least in part, to the presence of moiety II, i.e., the 2,6-dioxynaphthylene moiety, in combination with the other recited moieties. It has been observed that the tractability of the polymer is a function of the molar concentration of moiety II in the polymer to at least some degree.

The subject poly(ester-amide) readily forms liquid crystals in the melt phase. Such anisotropic properties are manifest at a temperature which is amenable for melt processing to form shaped articles. Such order in the melt may be confirmed by conventional polarized light techniques whereby crossed polarizers are utilized. More specifically, the anisotropic melt phase may conveniently be confirmed by the use of a Leitz polarizing microscope at a magnification of 40X with the sample on a Leitz hot stage and under a nitrogen atmosphere. The polymer melt is optically anisotropic, i.e., it transmits light when examined between crossed polarizers. Light is transmitted when the sample is optically anisotropic even in the static state.

The poly(ester-amide) of the present invention may be formed by a variety of techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, amine groups, etc. The organic monomer compounds may be reacted in the absence of a heat-exchange fluid via a melt acidolysis procedure. They accordingly may be heated initially to form a melt solution of the reactants with the reaction continuing as solid polymer particles are formed and suspended therein. A vacuum may be applied to facilitate removal of volatiles formed during the final stage of the condensation (e.g., acetic acid or water). Such a technique is disclosed in European Patent Application No. 79301276.6 (Publication No. 007 715), which is herein incorporated by reference.

In commonly assigned U.S. Pat. No. 4,067,852 of Gordon W. Calundann, entitled "Melt Processable Thermotropic Wholly Aromatic Polyester Containing Polyoxybenzoyl Units" is described a slurry polymerization process which, although directed to the production of wholly aromatic polyesters, may be employed to form the poly(ester-amide) of the present invention. In that process, the solid product is suspended in a heat exchange medium. The disclosure of this patent is herein incorporated by reference.

When employing either the melt acidolysis procedure or the slurry procedure of U.S. Pat. No. 4,067,852, the organic monomer reactants from which the hydroxyacid moiety (i.e., moiety I), the dioxynaphthylene moiety (i.e., moiety II), the amide-forming moiety (i.e., moiety IV), and the optional dioxyaryl moiety (i.e., moiety V) are derived may be initially provided in a modified form whereby the usual hydroxyl groups of these monomers are esterified (i.e., they are provided as acyl esters). For instance, lower acyl esters of p-hydroxybenzoic acid, 2,6-dihydroxynaphthalene, p-aminophenol, and hydroquinone, wherein the hydroxy groups are esterified, may be provided as reactants. The lower acyl groups preferably have from about 2 to about 4 carbon atoms. Preferably, the acetate esters of the organic compounds which form moieties I, II, IV, and V are provided. In addition, the amine group(s) of moiety IV may be provided as lower acyl amides. Accordingly, particularly preferred reactants for the condensation reaction are p-acetoxybenzoic acid, 2,6-dihydroxynaphthalene diacetate, p-acetoxyacetanilide, and hydroquinone diacetate.

Representative catalysts which optionally may be employed in either the melt acidolysis procedure or in the procedure of U.S. Pat. No. 4,067,852 include alkyl tin oxide (e.g., dibutyl tin oxide), diaryl tin oxide, alkyl tin acids, acyl esters of tin, titanium dioxide, alkoxy titanium silicates, titanium alkoxides, alkali and alkaline earth metal salts of carboxylic acids (e.g., sodium acetate), the gaseous acid catalysts such as Lewis acids (e.g., BF$_3$), hydrogen halides (e.g., HCl), etc. The quantity of catalyst utilized typically is about 0.001 to 1 percent by weight based upon the total monomer weight, and most commonly about 0.01 to 0.12 percent by weight.

The molecular weight of a previously formed poly(ester-amide) may be further increased via a solid state polymerization procedure wherein the particulate polymer is heated in a flowing inert gaseous atmosphere (e.g., in a flowing nitrogen atmosphere) at a temperature approximately 20° C. below the melting temperature of the polymer for 10 to 12 hours.

The poly(ester-amide) of the present invention readily can be melt processed to form a variety of shaped articles, e.g., molded three-dimensional articles, fibers, films, tapes, etc. The poly(ester-amide) of the present invention is especially suited for molding applications and may be molded via standard injection molding techniques commonly utilized when forming molded articles. It is not essential that more severe molding conditions (e.g., higher temperatures, compression molding, impact molding, or plasma spraying techniques) be utilized. Fibers or films may be melt extruded.

A molding compound may be formed from the poly(ester-amide) of the present invention which incorporates approximately 1 to 60 percent by weight of a solid filler (e.g., talc) and/or reinforcing agent (e.g., glass fibers).

The poly(ester-amide) also may be employed as a coating material which is applied as a powder or from a liquid dispersion.

When forming fibers and films, the extrusion orifice may be selected from among those commonly utilized during the melt extrusion of such shaped articles. For instance, the shaped extrusion orifice may be in the form of a rectangular slit (i.e., a slit die) when forming a polymeric film. When forming a filamentary material, the spinneret selected may contain a single orifice or, preferably, a plurality of extrusion orifices. For instance, a standard conical spinneret, such as those commonly used in the melt spinning of polyethylene terephthalate, containing 1 to 2000 holes (e.g., 6 to 1500 holes) having a diameter of about 1 to 60 mils (e.g., 5 to 40 mils) may be utilized. Yarns of about 20 to 200 continuous filaments are commonly formed. The melt-spinnable poly(ester-amide) is supplied to the extrusion orifice at a temperature above its melting temperature, e.g., a temperature of about 270° C. to 330° C. in preferred embodiments.

Subsequent to extrusion through the shaped orifice, the resulting filamentary material or film is passed in the direction of its length through a solidification or quench zone wherein the molten filamentary material or film is transformed into a solid filamentary material or film. The resulting fibers commonly have a denier per filament of about 2 to 40, and preferably a denier per filament of about 3 to 5.

The resulting filamentary material or film optionally may be subjected to a thermal treatment whereby its physical properties are further enhanced. The tenacity of the fiber or film generally is increased by such thermal treatment. More specifically, the fibers or films preferably may be thermally treated in an inert atmosphere (e.g., nitrogen, argon, helium) or alternatively in a flowing oxygen-containing atmosphere (e.g., air) with or without stress at a temperature below the polymer melting temperature until the desired property enhancement is achieved. Thermal treatment times commonly range from a few minutes to several days. Generally, as the product is thermally treated, its melting temperature progressively is raised. The temperature of the atmosphere may be staged or continuously increased during the thermal treatment or held at a constant level. For instance, the product may be heated at 250° C. for one hour, at 260° C. for one hour, and at 270° C. for one hour. Alternatively, the product may be heated at about 10° C. to 20° C. below the temperature at which it melts for about 45 hours. Optimal heat treatment conditions will vary with the specific composition of the poly(ester-amide) and with the process history of the product.

The as-spun fibers formed from the poly(ester-amide) of the present invention are fully oriented and exhibit highly satisfactory physical properties which render them suitable for use in high performance applications. The as-spun fibers commonly exhibit an average single filament tenacity of at least 1 gram per denier (e.g., about 3 to 10 grams per denier) and an average single filament tensile modulus of at least about 200 grams per denier (e.g., about 300 to 800 grams per denier) and exhibit an extraordinary dimensional stability at elevated temperature (e.g., at temperatures of about 150° to 200° C.). Following thermal treatment (i.e., annealing), the fibers commonly exhibit an average single filament tenacity of at least 5 grams per denier (e.g., 15 to 40 grams per denier). Such properties enable the fibers to be used with particular advantage as tire cords and in other industrial applications, such as conveyor belts, hose, rope, cabling, resin reinforcement, etc. Films formed of the polyester of the present invention may be used as strapping tape, cable wrap, magnetic tape, electric motor dielectric film, etc. The fibers and films exhibit an inherent resistance to burning.

It is anticipated that the poly(ester-amide) compositions of the present invention will exhibit improved adhesion, improved fatigue resistance, and increased transverse strength over known polymers, such as wholly aromatic polyesters. It is also anticipated that the poly(ester-amide) compositions of the present invention will be especially useful as molding resins.

The following Examples are presented as specific illustrations of the claimed invention. It should be understood, however, that the invention is not limited to the specific details set forth in the Examples.

EXAMPLE 1

This Example illustrates the preparation of a poly(ester-amide) from p-hydroxybenzoic acid, 2,6-dihydroxynaphthalene, terephthalic acid, and 1,4-phenylenediamine (or derivatives thereof) in the molar ratio 60:15:20:5.

A 300 ml. 3-necked polymer flask was fitted with a sealed glass paddle stirrer, a nitrogen inlet, a distillation head, a condenser, and a receiver. Into the flask were placed 54.05 g. (0.3 mole) of 4-acetoxybenzoic acid; 18.32 g. (0.075 mole) of 2,6-dihydroxynaphthalene diacetate; 16.61 g. (0.1 mole) of terephthalic acid; and 4.81 g. (0.025 mole) of N,N'-1,4-phenylenebisacetamide. Sodium acetate (200 p.p.m.) was added as a polymerization catalyst.

The apparatus was evacuated, purged with nitrogen, and placed under a nitrogen atmosphere. The flask was heated in an external oil bath to 250° C. in order to initiate the polymerization. Polymerization was conducted under a stream of nitrogen between 250° C. and 310° C. for 2 hours, at 330° C. for 15 minutes, at 340° C. for 15 minutes, and then under vacuum (0.35 Torr) at 340° C. for 5 minutes.

After cooling to room temperature, the polymer was recovered from the broken polymer flask, ground through a 6 mm. screen in a Wiley mill, extracted in a Soxhlet extractor with acetone and petroleum ether, and air dried.

The polymer exhibited an inherent viscosity of 2.75 dl./g. when measured at a concentration of 0.1 weight-/volume percent in pentafluorophenol at 60° C. The polymer exhibited an endotherm at 357° C. when measured by differential scanning calorimetry. The polymer exhibited an anisotropic melt phase.

EXAMPLE 2

This Example illustrates the preparation of a poly(ester-amide) from p-hydroxybenzoic acid, 2,6-dihydroxynaphthalene, terephthalic acid, and p-aminophenol, (or derivatives thereof) in a molar ratio 50:15:25:10.

Into the apparatus described in Example 1 were placed 45 g. (0.25 mole) of p-acetoxybenzoic acid; 18.3 g. (0.075 mole) of 2,6-dihydroxynaphthalene diacetate; 20.75 g. (0.125 mole) of terephthalic acid; and 9.8 g. (0.051 mole) of p-acetoxyacetanilide. 0.02 g. of sodium acetate was added as a catalyst.

The flask was evacuated and flushed with dry nitrogen three times. The flask was heated to 250° C. in an oil bath. The melt soon began to evolve acetic acid. After 45 minutes at 250° C., 14.3 ml. (50% of the theoretical yield) of acetic acid had been collected. The mixture was then heated at 280° C. for 45 minutes, by which time 20.2 ml. (71% theoretical yield) of acetic acid had been collected. The opaque, pale yellow melt was then heated at 300° C. for 30 minutes, and then at 320° C. for 30 minutes. The melt rapidly thickened and began to ball up around the stirrer shaft. By this time, a total of 23.4 ml. (82% of the theoretical yield) of acetic acid had been collected. Heating was continued for another 20 minutes at 340°–350° C.

After cooling under nitrogen, the fawn-colored solid was broken from the flask and ground in a Wiley mill.

The polymer was insoluble in pentafluorophenol at 60° C. The polymer exhibited a Tm of 355° C. when measured by differential scanning calorimetry. The polymer exhibited an anisotropic melt phase at 360° C.

EXAMPLE 3

This Example illustrates the preparation of a poly(ester-amide) from p-hydroxybenzoic acid, 2,6-dihydroxynaphthalene, isophthalic acid, terephthalic acid, and 1,4-phenylenediamine (or derivatives thereof) in the molar ratio 50:20:10:15:5.

Into the apparatus described in Example 1 were placed 45.0 g. (0.25 mole) of p-acetoxybenzoic acid, 24.4 g. (0.1 mole) of 2,6-dihydroxynaphthalene diacetate, 8.3 g. (0.05 mole) of isophthalic acid, 12.5 g. (0.075 mole) of terephthalic acid, and 4.8 g. (0.025 mole) of N,N'-1,4-phenylenebisacetamide.

The monomers were polymerized essentially as in Example 1 but without the addition of a catalyst. The monomers were polymerized for 3¼ hours between the temperatures of 250° C. and 340° C. under nitrogen, then for an additional ¾ hr. under vacuum (0.35 Torr). After grinding and extracting as in Example 1, a small portion of polymer chip was placed in a test tube and melted under a blanket of nitrogen. Fibers could be pulled from the melt with a glass stirring rod. The polymer exhibited an I.V. of 3.56 dl./g., when measured as in Example 1, and thermal analysis by DSC found endotherms at 250° C. and 360° C. The polymer exhibited an anisotropic melt phase.

EXAMPLE 4

This Example illustrates the preparation of a poly(ester-amide) from p-hydroxybenzoic acid, 2,6-dihydroxynaphthalene, trans-1,4-cyclohexanedicarboxylic acid, and p-aminophenol (or derivatives thereof) in the molar ratio 50:15:25:10.

The apparatus of Example 1 was charged with 45.0 g. (0.25 mole) of p-acetoxybenzoic acid, 18.3 g. (0.075 mole) of 2,6-dihydroxynaphthalene diacetate, 21.5 g. (0.125 mole) of trans-1,4-cyclohexanedicarboxylic acid, and 9.8 g. (0.051 mole) of p-acetoxyacetanilide. Sodium acetate (0.02 g.) was added as catalyst.

The melt polymerization was carried out under argon for 1 hr. at 250° C., 1 hr. at 280° C., 45 minutes at 300° C., 30 minutes at 320° C., and 30 minutes at 340° C. Finally, vacuum (0.5 Torr) was applied at 340° C. for 20 minutes to complete the polymerization.

When isolated as in Example 1, the polymer was tough and pale tan colored. The polymer exhibited an I.V. of 5.6 dl./g. when measured as in Example 1, and DSC measurements showed a $T_m$ endotherm at 278° C. The polymer formed an anistropic melt.

The polymer was ground in a Wiley mill and extracted for 2 hours in a Soxhlet apparatus in order to remove low molecular weight impurities. After drying, the polymer was melt spun through a 0.007 inch single hole spinneret at 344° C. at a throughput of 0.42 g./min. and a take-up speed of 71 m./min. The following as-spun single filament properties were exhibited:

| | |
|---|---|
| Tenacity | 4.3 g./d. |
| Elongation | 1.3% |
| Initial Modulus | 403 g./d. |
| Denier | 33 |

EXAMPLE 5

This Example illustrates the preparation of a poly(ester-amide) from p-hydroxybenzoic acid, 2,6-dihydroxynaphthalene, trans-1,4-cyclohexanedicarboxylic acid, terephthalic acid, and p-aminophenol (or derivatives thereof) in the molar ratio 50:15:12.5:12.5:10.

The apparatus of Example 1 was charged with (0.25 mole) of p-acetoxybenzoic acid, 18.3 g. (0.075 mole) of 2,6-dihydroxynaphthalene diacetate, 10.75 g. (0.0625 mole) of trans-1,4-cyclohexanedicarboxylic acid, 10.4 g. (0.0625 mole) of terephthalic acid, and 9.8 g. (0.051 mole) of p-acetoxyacetanilide. Sodium acetate (0.02 g.) was added as a catalyst. The melt polymerization was carried out as in Example 4 between 250° C. and 340° C., finally applying vacuum (0.5 Torr) for 30 minutes at 340° C.

The polymer exhibited an I.V. of 5.1 dl./g., when measured as in Example 1. When measured by DSC, the polymer exhibited a $T_m$ endotherm at 310° C. An anisotropic melt phase was observed.

The polymer was melt spun at 375° C. through a 0.007 inch single hole spinneret at a throughput of 0.14 g./min. and a take-up speed of 311 m./min. The following as-spun single filament properties were exhibited:

| | |
|---|---|
| Tenacity | 4.7 g./d. |
| Elongation | 1.4% |
| Initial Modulus | 460 g./d. |
| Denier | 5.7 |

Following heat treatment in a dry nitrogen flow at 282° C. for 15 hours, the following single filament properties were exhibited:

| | |
|---|---|
| Tenacity | 12.1 g./d. |
| Elongation | 2.29% |

| Initial Modulus | 457 g./d. |

EXAMPLE 6

This Example illustrates the preparation of a poly(ester-amide) from p-hydroxybenzoic acid, 2,6-dihydroxynaphthalene, terephthalic acid, isophthalic acid, and p-aminophenol (or derivatives thereof) in the molar ratio 50:20:15:10:5.

Into the apparatus described in Example 1 were charged 45 g. (0.25 mole) of p-acetoxybenzoic acid, 24.4 g. (0.10 mole) of 2,6-dihydroxynaphthalene diacetate, 12.45 g. (0.075 mole) of terephthalic acid, 8.3 g. (0.05 mole) of isophthalic acid, and 49 g. (0.0254 mole) of p-acetoxyacetanilide, in the presence of 0.02 g. of sodium acetate as a catalyst.

Melt polymerization was conducted at 250°–340° C. as in Example 4. Full vacuum (0.14 Torr) was applied at 340° C. for 10 minutes.

The polymer thus formed exhibited on I.V. of 3.6 dl./g., when measured as in Example 1. When measured by DSC, the polymer exhibited a $T_g$ inflection at 115° C., but no distinct $T_m$ endotherm was observed. The melt was anisotropic at 330° C.

A single filament melt spun at 373° C. through a 0.007 inch single hole spinneret at a throughput of 0.42 g./min. and a take-up speed of 54 m./min. exhibited the following as-spun properties.

| Tenacity | 5.2 g./d. |
| Elongation | 2.2% |
| Initial Modulus | 360 g./d. |
| Denier | 85 |

Following heat treatment in a dry nitrogen flow at 282° C. for 15 hours, the following single filament properties were exhibited:

| Tenacity | 8.8 g./d. |
| Elongation | 2.0% |
| Initial Modulus | 487 g./d. |

EXAMPLE 7

This Example illustrates the preparation of a poly(ester-amide) from p-hydroxybenzoic acid, 2,6-dihydroxynaphthalene, terephthalic acid, isophthalic acid, and p-aminophenol (or derivatives thereof) in the molar ratio 40:20:10:20:10.

Into the apparatus described in Example 1 were charged 36 g. (0.20 mole) of p-acetoxybenzoic acid, 24.4 g. (0.10 mole) of 2,6-dihydroxynaphthalene diacetate, 8.3 g. (0.05 mole) of terephthalic acid, 16.6 g. (0.10 mole) of isophthalic acid, and 9.8 g. (0.051 mole) of p-acetoxyacetanilide in the presence of 0.02 g. sodium acetate as a catalyst.

Melt polymerization was conducted as in Example 6. The polymer exhibited an I.V. of 1.72 dl./g. when measured as in Example 1. When measured by DSC, the polymer exhibited a $T_g$ inflection at 130° C., but not distinct $T_m$ endotherm was observed. The melt was anisotropic at 330° C.

A single filament melt spun at 330° C. through a 0.007 inch single hole spinneret at a throughput of 0.14 g./min. and a take-up speed of 52 m./min. exhibited the following as-spun properties:

| Tenacity | 1.62 g./d. |
| Elongation | 1.0% |
| Initial Modulus | 190 g./d. |
| Denier | 36. |

Although the invention has been described with preferred embodiments, it is to be understood that variations and modifications may be employed as will be apparent to those of ordinary skill in the art. Such variations and modifications are to be considered within the purview and scope of the claims appended hereto.

We claim:

1. A melt processable poly(ester-amide) capable of forming an anisotropic melt phase at a temperature below approximately 400° C. consisting essentially of recurring moieties I, II, III, IV, and, optionally, V wherein:

I is

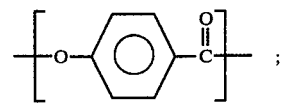

II is

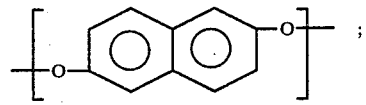

III is

where A is a divalent carbocyclic radical;

IV is $+Y-Ar-Z+$, where Ar is a divalent radical comprising at least one aromatic ring, Y is O, NH, or NR, and Z is NH or NR, where R is an alkyl group of 1 to 6 carbon atoms or an aryl group; and V is $+O-Ar'-O+$, where Ar' is a divalent radical comprising at least one aromatic ring, other than naphthylene, wherein at least some of the hydrogen atoms present upon the rings optionally may be replaced by substitution selected from the group consisting of alkyl group of 1 to 4 carbon atoms, an alkoxy group of 1 to 4 carbon atoms, halogen, phenyl, and mixtures thereof, and wherein moiety I is present in a concentration within the range of approximately 20 to 80 mole percent, moiety II is present in a concentration within the range of approximately 5 to 30 mole percent, moiety III is present in a concentration within the range of approximately 10 to 40 mole percent, moiety IV is present in a concentration within the range of approximately 5 to 30 mole percent, and moiety V is present in a concentration within the range of approximately 0 to 20 mole percent, with the total molar concentration of moieties II, IV, and V being substantially equal to the molar concentration of moiety III.

2. The melt processable poly(ester-amide) of claim 1 which is capable of forming an anisotropic melt phase at a temperature below approximately 350° C.

3. The melt processable poly(ester-amide) of claim 1 which exhibits an inherent viscosity of at least approximately 1.0 dl./g. when measured at a concentration of 0.1 weight/volume percent in pentafluorophenol at 60° C.

4. The melt processable poly(ester-amide) of claim 3 which exhibits an inherent viscosity of at least approximately 2.0 dl./g. when measured at a concentration of 0.1 weight/volume percent in pentafluorophenol at 60° C.

5. The melt processable poly(ester-amide) of claim 1 wherein the total molar concentration of moieties II, IV, and V and the molar concentration of moiety III each is substantially equal to one-half of the difference between 100 mole percent and the molar concentration of moiety I.

6. The melt processable poly(ester-amide) of claim 1 wherein moiety I is present in a concentration within the range of approximately 40 to 60 mole percent.

7. The melt processable poly(ester-amide) of claim 1 wherein moiety II is present in a concentration within the range of approximately 10 to 25 mole percent.

8. The melt processable poly(ester-amide) of claim 1 wherein moiety III is present in a concentration within the range of approximately 15 to 30 mole percent.

9. The melt processable poly(ester-amide) of claim 1 wherein moiety IV is present in a concentration within the range of approximately 5 to 15 mole percent.

10. The melt processable poly(ester-amide) of claim 10 wherein moiety V is present in a concentration within the range of approximately 0 to 10 mole percent.

11. The melt processable poly(ester-amide) of claim 10 wherein moiety V is present in a concentration within the range of approximately 5 to 10 mole percent.

12. The melt processable poly(ester-amide) of claim 1 wherein the divalent carbocyclic radical of moiety III comprises at least one aromatic ring or a trans-1,4-cyclohexylene radical.

13. The melt processable poly(ester-amide) of claim 12 wherein the divalent carbocyclic radical of moiety III comprises at least one aromatic ring.

14. A molding compound comprising the melt processable poly(ester-amide) of claim 1 which incorporates approximately 1 to 60 percent by weight of a solid filler and/or reinforcing agent.

15. A molded article comprising the melt processable poly(ester-amide) of claim 1.

16. A fiber which has been melt spun from the melt processable poly(ester-amide) of claim 1.

17. A film which has been melt extruded from the melt processable poly(ester-amide) of claim 1.

18. A melt processable poly(ester-amide) capable of forming an anisotropic melt phase at a temperature below approximately 400° C. consisting essentially of recurring moieties I, II, III, IV, and, optionally V wherein:

I is

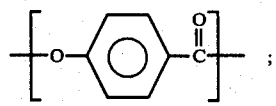

II is

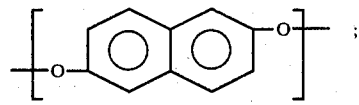

III is

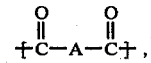

where A is a divalent carbocyclic radical;

IV is $+Y-Ar-Z+$, where Ar is a divalent radical comprising at least one aromatic ring, Y is O, NH, or NR, and Z is NH or NR, where R is an alkyl group of 1 to 6 carbon atoms or an aryl group; and V is $+O-Ar'-O+$, where Ar' is a divalent radical comprising at least one aromatic ring, other than naphthylene, wherein at least some of the hydrogen atoms present upon the aromatic rings optionally may be replaced by substitution selected from the group consisting of an alkyl group of 1 to 4 carbon atoms, an alkoxy group of 1 to 4 carbon atoms, halogen, phenyl, and mixtures thereof, and wherein moiety I is present in a concentration within the range of approximately 40 to 60 mole percent, moiety II is present in a concentration within the range of approximately 10 to 25 mole percent, moiety III is present in a concentration within the range of approximately 15 to 30 mole percent, moiety IV is present in a concentration within the range of approximately 5 to 15 mole percent, and moiety V is present in a concentration within the range of approximately 0 to 10 mole percent, with the total molar concentration of moieties II, IV, and V being substantially equal to the molar concentration of moiety III.

19. The melt processable poly(ester-amide) of claim 18 which is capable of forming an anisotropic melt phase at a temperature below approximately 350° C.

20. The melt processable poly(ester-amide) of claim 18 which exhibits an inherent viscosity of at least approximately 1.0 dl./g. when measured at a concentration of 0.1 weight/volume percent in pentafluorophenol at 60° C.

21. The melt processable poly(ester-amide) of claim 20 which exhibits an inherent viscosity within the range of approximately 3.0 to 8.0 dl./g. when measured at a concentration of 0.1 weight/volume percent of pentafluorophenol at 60° C.

22. The melt processable poly(ester-amide) of claim 18 wherein the total molar concentration of moieties II, IV, and V and the molar concentration of moiety III each is substantially equal to one-half of the difference between 100 mole percent and the molar concentration of moiety I.

23. The melt processable poly(ester-amide) of claim 18 wherein moiety I is present in a concentration within the range of approximately 50 to 60 mole percent.

24. The melt processable poly(ester-amide) of claim 18 wherein moiety II is present in a concentration within the range of approximately 15 to 25 mole percent.

25. The melt processable poly(ester-amide) of claim 18 wherein moiety III is present in a concentration within the range of approximately 20 to 30 mole percent.

26. The melt processable poly(ester-amide) of claim 18 wherein moiety IV is present in a concentration within the range of approximately 5 to 10 mole percent.

27. The melt processable poly(ester-amide) of claim 18 wherein moiety V is present in a concentration within the range of approximately 5 to 10 mole percent.

28. The melt processable poly(ester-amide) of claim 18 wherein the divalent carbocyclic radical of moiety III comprises at least one aromatic ring or a trans-1,4-cyclohexylene radical.

29. The melt processable poly(ester-amide) of claim 18 wherein the divalent carbocyclic radical of moiety III comprises at least one aromatic ring.

30. A molding compound comprising the melt processable poly(ester-amide) of claim 18 which incorporates approximately 1 to 60 percent by weight of a solid filler and/or reinforcing agent.

31. A molded article comprising the melt processable poly(ester-amide) of claim 18.

32. A fiber which has been melt spun from the melt processable poly(ester-amide) of claim 18.

33. A film which has been melt extruded from the melt processable poly(ester-amide) of claim 18.

34. A melt processable poly(ester-amide) capable of forming an anisotropic melt phase at a temperature below approximately 400° C. consisting essentially of recurring moieties I, II, III, IV, and, optionally, V wherein:

I is

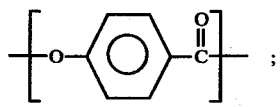

II is

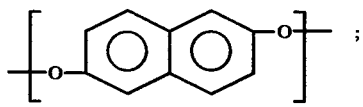

III is

where A is a divalent radical comprising at least one aromatic ring or a trans-1,4-cyclohexylene radical;

IV is +Y—Ar—Z+, where Ar is a divalent radical comprising at least one aromatic ring, Y is O, NH, or NR, and Z is NH or NR, where R is an alkyl group of 1 to 6 carbon atoms or an aryl group; and V is +O—Ar'—O+, where Ar' is a divalent radical comprising at least one aromatic ring, other than naphthylene, wherein at least some of the hydrogen atoms present upon the aromatic rings optionally may be replaced by substitution selected from the group consisting of an alkyl group of 1 to 4 carbon atoms, an alkoxy group of 1 to 4 carbon atoms, halogen, phenyl, and mixtures thereof, and wherein moiety I is present in a concentration within the range of approximately 50 to 60 mole percent, moiety II is present in a concentration within the range of approximately 15 to 25 mole percent, moiety III is present in a concentration within the range of approximately 20 to 30 mole percent, moiety IV is present in a concentration within the range of approximately 5 to 10 mole percent, and moiety V is present in a concentration within the range of approximately 0 to 10 mole percent, with the total molar concentration of moieties II, IV, and V being substantially equal to the molar concentration of moiety III.

35. The melt processable poly(ester-amide) of claim 34 which exhibits an inherent viscosity of at least approximately 1.0 dl./g. when measured at a concentration of 0.1 weight/volume percent in pentafluorophenol at 60° C.

36. The melt processable poly(ester-amide) of claim 35 which exhibits an inherent viscosity within the range of approximately 3.0 to 8.0 dl./g. when measured at a concentration of 0.1 weight/volume percent in pentafluorophenol at 60° C.

37. The melt processable poly(ester-amide) of claim 34 wherein moiety V is present in a concentration within the range of approximately 5 to 10 mole percent.

38. The melt processable (poly(ester-amide) of claim 34 wherein the divalent carbocyclic radical of moiety III comprises at least one aromatic ring.

39. The melt processable poly(ester-amide) of claim 34 wherein moiety IV is derived from p-aminophenol or p-phenylenediamine.

40. The melt processable poly(ester-amide) of claim 34 wherein moiety V is derived from hydroquinone.

41. A molding compound comprising the melt processable poly(ester-amide) of claim 34 which incorporates approximately 1 to 60 percent by weight of a solid filler and/or reinforcing agent.

42. A molded article comprising the melt processable poly(ester-amide) of claim 34.

43. A fiber which has been melt spun from the melt processable poly(ester-amide) of claim 34.

44. A film which has been melt extruded from the melt processable poly(ester-amide) of claim 34.

* * * * *